US012561723B1

(12) United States Patent
Genc et al.

(10) Patent No.: US 12,561,723 B1
(45) Date of Patent: Feb. 24, 2026

(54) REINFORCEMENT LEARNING BASED SEARCH RESULTS

(71) Applicant: Amazon Technologies, Inc., Seattle, WA (US)

(72) Inventors: Sahika Genc, Hayden, ID (US); Jiaying Shi, Fremont, CA (US); Wenyang Liu, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 195 days.

(21) Appl. No.: 18/467,289

(22) Filed: Sep. 14, 2023

(51) Int. Cl.
*G06Q 30/0601* (2023.01)
*G06F 16/248* (2019.01)

(52) U.S. Cl.
CPC ....... *G06Q 30/0627* (2013.01); *G06F 16/248* (2019.01); *G06Q 30/0643* (2013.01)

(58) Field of Classification Search
CPC ............ G06Q 30/0627; G06Q 30/0643; G06F 16/9535; G06F 16/24578; G06F 16/9538; G06F 16/248; G06F 16/90335; G06F 16/338; G06F 16/9038
USPC ....... 707/706, 722, 723, 732, 736, 748, 752, 707/769, 805
See application file for complete search history.

(56) References Cited

U.S. PATENT DOCUMENTS

| | | | | |
|---|---|---|---|---|
| 10,929,783 B1* | 2/2021 | Davis | ..................... | G06Q 50/14 |
| 2009/0119254 A1* | 5/2009 | Cross | ................. | G06F 16/9535 |
| | | | | 707/999.003 |
| 2019/0179938 A1* | 6/2019 | Feuz | ...................... | G06N 3/092 |
| 2024/0249198 A1* | 7/2024 | Chabot | ................. | G06N 3/006 |

OTHER PUBLICATIONS

Bello et al., "Neural Combinatorial Optimization with Reinforcement Learning," International Conference on Learning Representations (ICLR) 2017, Jan. 12, 2017, pp. 1-15.
Bohm et al., "Better Rewards Yield Better Summaries: Learning to Summarise Without References," Proceedings of the 2019 Conference on Empirical Methods in Natural Language Processing and the 9th International Joint Conference on Natural Language Processing (EMNLP-IJCNLP), Sep. 3, 2019, 11 pages.
Degenne et al., "Bridging the Gap Between Regret Minimization and Best Arm Identification with Application to A/B Tests," International Conference on Artificial Intelligence and Statistics, Oct. 2018, 19 pages.
Mazyavkina et al., "Reinforcement Learning for Combinatorial Optimization: A Survey," Computers & Operations Research, vol. 134, Mar. 2020; Revised Dec. 2020, pp. 1-24.

(Continued)

*Primary Examiner* — Phong H Nguyen
(74) *Attorney, Agent, or Firm* — Kilpatrick Townsend & Stockton LLP

(57) ABSTRACT
Techniques are described herein for reinforcement learning model based search result generation. An example method includes generating a search result by using a reinforcement learning model The method can include receiving a reward based on a state associated with the first search result. The method can include changing the weights of the reinforcement learning model. The method can further include generate a second search result using the reinforcement learning model based on the changed weights.

19 Claims, 8 Drawing Sheets

(56) References Cited

OTHER PUBLICATIONS

Ouyang et al., "Training Language Models to Follow Instructions with Human Feedback," Computation and Language, Available Online at: https://doi.org/10.48550/arXiv.2203.02155, Mar. 4, 2022, 68 pages.

Schulman et al., "Proximal Policy Optimization Algorithms," Available Online at: https://arxiv.org/pdf/1707.06347.pdf, Aug. 28, 2017, pp. 1-12.

Song et al., "Solving the Traveling Salesperson Problem with Deep Reinforcement Learning on Amazon Sagemaker," AWS Open Source Blog, Available Online at: https://aws.amazon.com/blogs/opensource/solving-the-traveling-salesperson-problem-with-deep-reinforcement-learning-on-amazon-sagemaker/, Sep. 24, 2021, 13 pages.

Ziegler et al., "Fine-Tuning Language Models from Human Preferences," OpenAI, Available Online at: https://arxiv.org/pdf/1909.08593.pdf, Jan. 8, 2020, 26 pages.

* cited by examiner

300

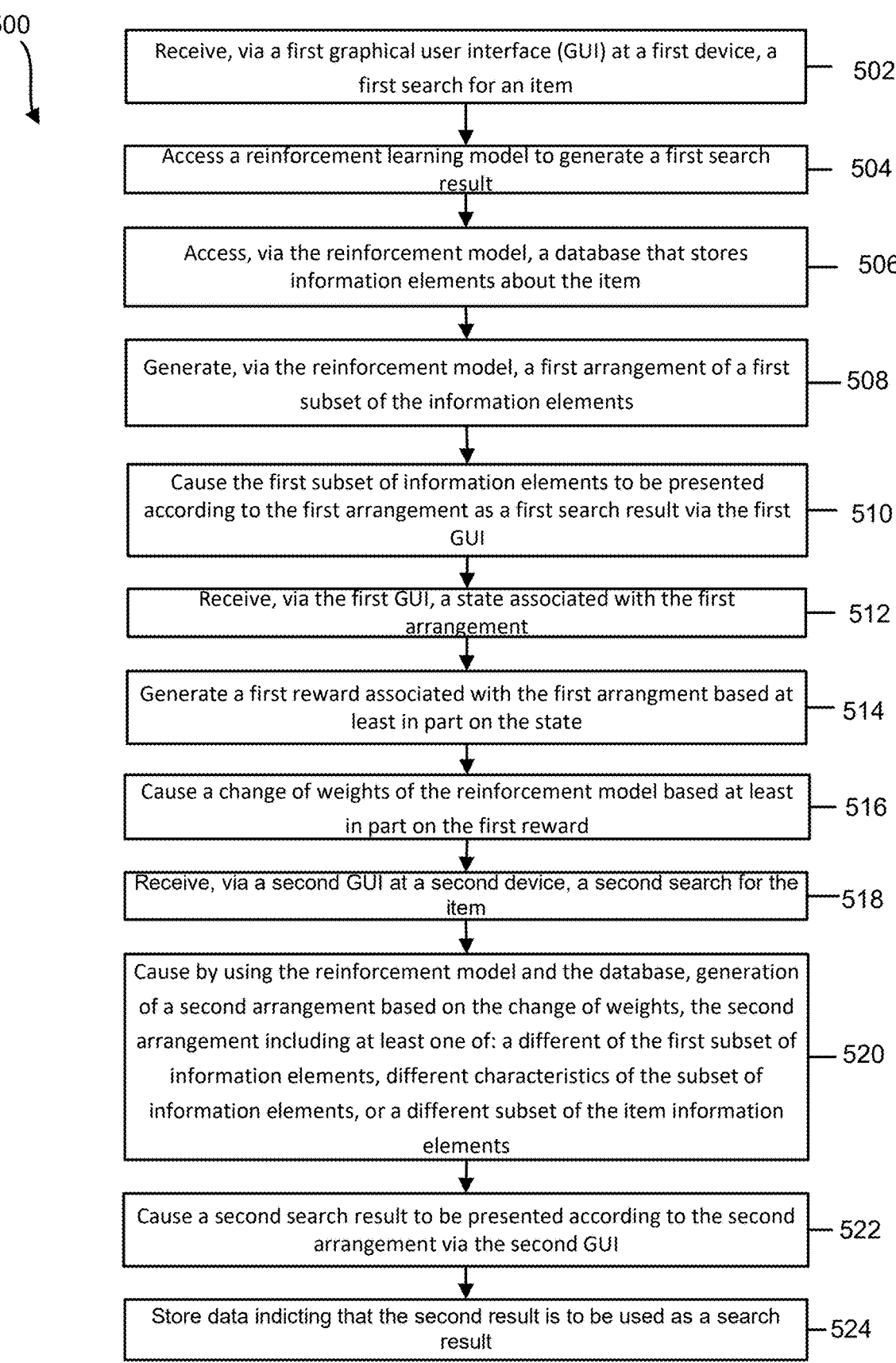

500

Receive, via a first graphical user interface (GUI) at a first device, a first search for an item — 502

Access a reinforcement learning model to generate a first search result — 504

Access, via the reinforcement model, a database that stores information elements about the item — 506

Generate, via the reinforcement model, a first arrangement of a first subset of the information elements — 508

Cause the first subset of information elements to be presented according to the first arrangement as a first search result via the first GUI — 510

Receive, via the first GUI, a state associated with the first arrangement — 512

Generate a first reward associated with the first arrangment based at least in part on the state — 514

Cause a change of weights of the reinforcement model based at least in part on the first reward — 516

Receive, via a second GUI at a second device, a second search for the item — 518

Cause by using the reinforcement model and the database, generation of a second arrangement based on the change of weights, the second arrangement including at least one of: a different of the first subset of information elements, different characteristics of the subset of information elements, or a different subset of the item information elements — 520

Cause a second search result to be presented according to the second arrangement via the second GUI — 522

Store data indicting that the second result is to be used as a search result — 524

FIG. 5

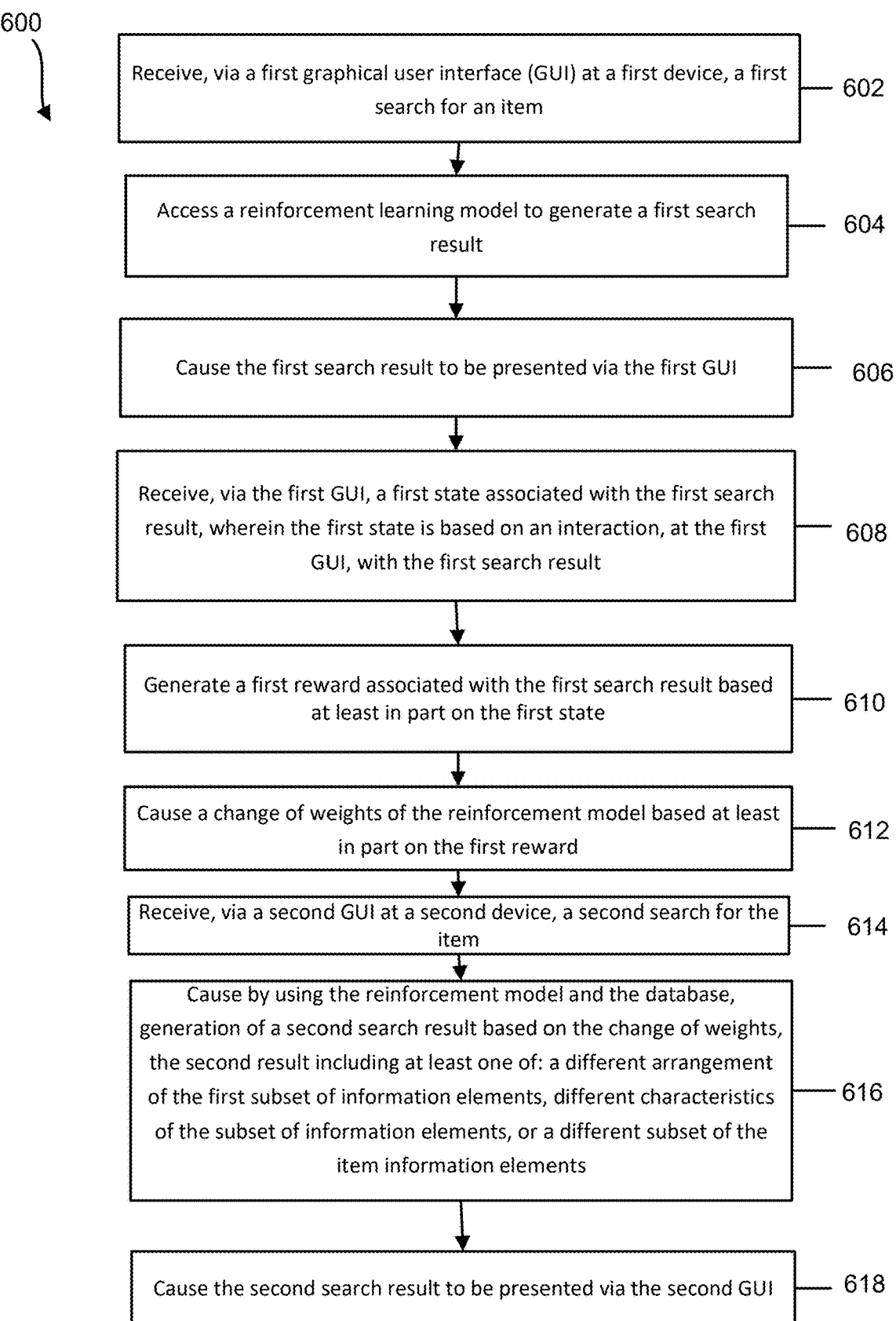

600

Receive, via a first graphical user interface (GUI) at a first device, a first search for an item — 602

Access a reinforcement learning model to generate a first search result — 604

Cause the first search result to be presented via the first GUI — 606

Receive, via the first GUI, a first state associated with the first search result, wherein the first state is based on an interaction, at the first GUI, with the first search result — 608

Generate a first reward associated with the first search result based at least in part on the first state — 610

Cause a change of weights of the reinforcement model based at least in part on the first reward — 612

Receive, via a second GUI at a second device, a second search for the item — 614

Cause by using the reinforcement model and the database, generation of a second search result based on the change of weights, the second result including at least one of: a different arrangement of the first subset of information elements, different characteristics of the subset of information elements, or a different subset of the item information elements — 616

Cause the second search result to be presented via the second GUI — 618

FIG. 6

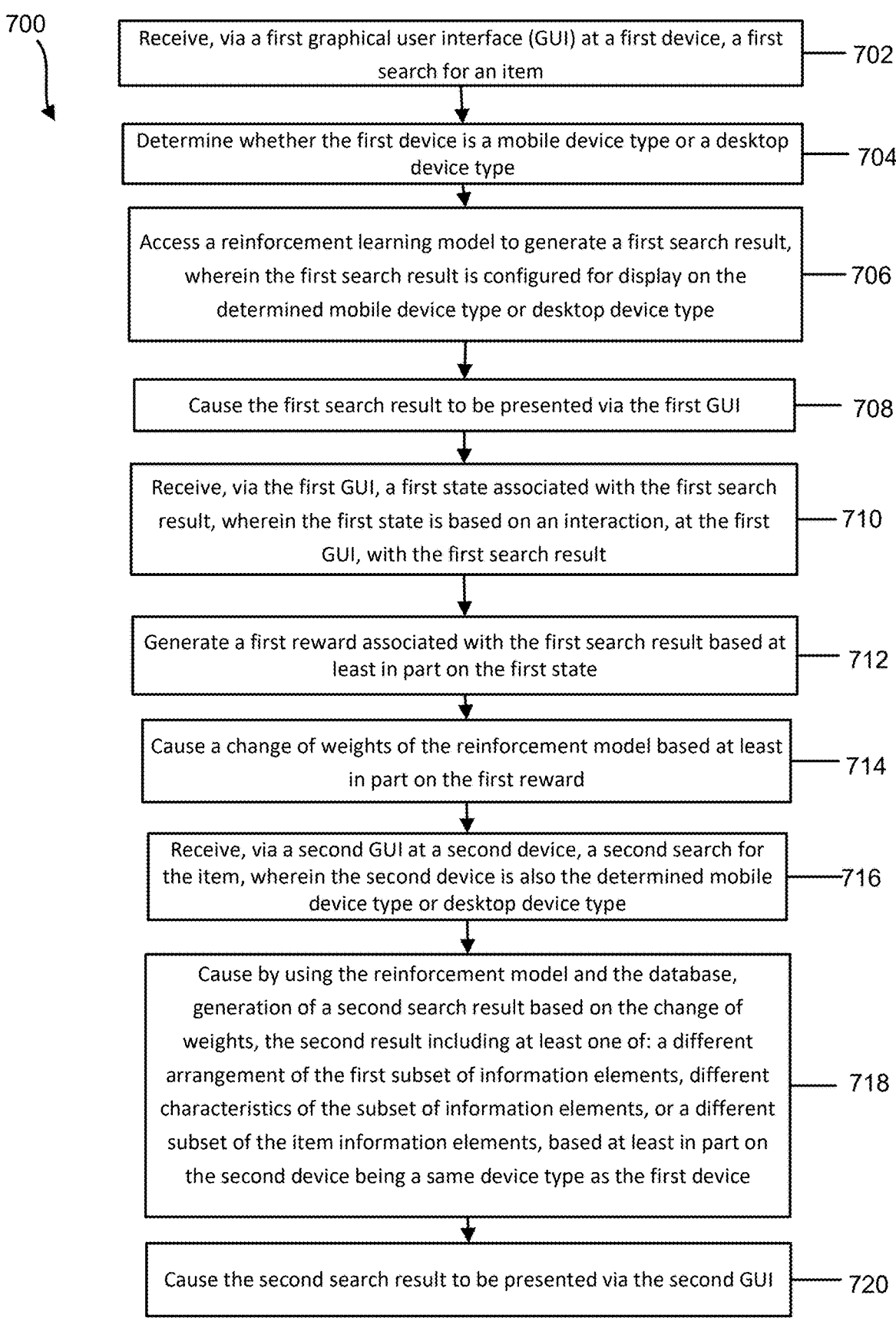

700

Receive, via a first graphical user interface (GUI) at a first device, a first search for an item — 702

Determine whether the first device is a mobile device type or a desktop device type — 704

Access a reinforcement learning model to generate a first search result, wherein the first search result is configured for display on the determined mobile device type or desktop device type — 706

Cause the first search result to be presented via the first GUI — 708

Receive, via the first GUI, a first state associated with the first search result, wherein the first state is based on an interaction, at the first GUI, with the first search result — 710

Generate a first reward associated with the first search result based at least in part on the first state — 712

Cause a change of weights of the reinforcement model based at least in part on the first reward — 714

Receive, via a second GUI at a second device, a second search for the item, wherein the second device is also the determined mobile device type or desktop device type — 716

Cause by using the reinforcement model and the database, generation of a second search result based on the change of weights, the second result including at least one of: a different arrangement of the first subset of information elements, different characteristics of the subset of information elements, or a different subset of the item information elements, based at least in part on the second device being a same device type as the first device — 718

Cause the second search result to be presented via the second GUI — 720

FIG. 7

REINFORCEMENT LEARNING BASED SEARCH RESULTS

BACKGROUND

More and more users interact with the internet to learn information about items and services. For example, a user can use a computing device to enter an online search onto a web portal that includes a generic description of an item. The user can receive multiple search results that are displayed on the computing device. Each search result can include a respective items that fits the generic description. The user can browse information provided in each search result to learn more about the item.

BRIEF DESCRIPTION OF THE DRAWINGS

Various embodiments in accordance with the present disclosure will be described with reference to the drawings, in which:

FIG. 5 is a process flow for generating a search result, according to embodiments of the present disclosure.

FIG. 6 is a process flow for generating a search result, according to embodiments of the present disclosure.

FIG. 7 is a process flow for generating a search result, according to embodiments of the present disclosure.

DETAILED DESCRIPTION

Figure 1:
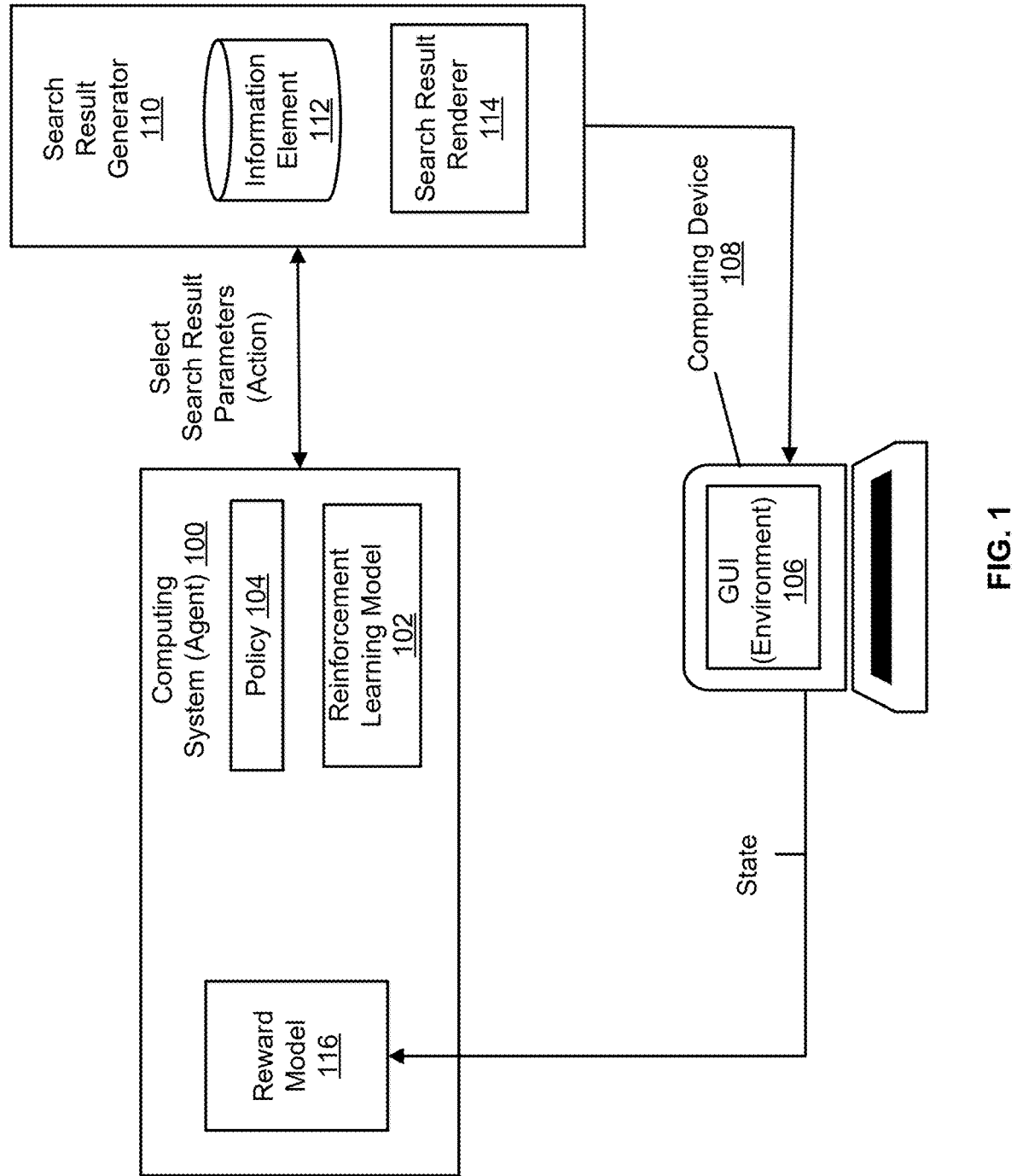
FIG. 1 illustrates an example of a system for reinforcement learning based search results, according to embodiments of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, generating real-time search results using reinforcement learning. A computing system associated with generating real-time search results using reinforcement learning can receive a search from a user via a graphical user interface (GUI). The search request can include a description of an item. In some instances, the item can be a purchasable item. The computing system can use a language processing technique to understand the search request and the item that the search request is directed towards. Based on the understanding, the computing system can access a database of items and identify the item associated with the search request. The computing system can further use a reinforcement learning model and access content from a database that describes the items. For example, the computing system can access different images and different text that describe different aspects of the item.

The computing system can determine an arrangement of the content to be displayed on the GUI. For example, the computing system can determine which images to present, the size of the image, and the placement of the images in relation to any other images or text. The computing system can further determine what text to present, the characteristics of the text (e.g., size, font), and a placement of the text in relation to any other text or images. The computing system can cause the generation of a search result that includes the content selected by the computing system and the arrangement of the content as determined by the computing system. The computing system can further cause the search result to be displayed on the GUI as a search result. The GUI can monitor the user's interaction with the search result displayed on the GUI for interaction with the search result. For example, the GUI can be configured to monitor the time the search result is displayed on the GUI, whether the user clicked any hyperlinks displayed on the GUI, and whether the user initiated purchasing the item displayed on the search result. The computing system can further evaluate the interactions between the user and the search result according to a ranking of interactions. For example, clicking on an input (e.g., a "read more" input) to reveal hidden content can be a higher ranked interaction than viewing the search result for a threshold period of time. Additionally, purchasing the item displayed on the search result can be a higher ranked interaction than any other interaction. The computing system can further map the interactions to different rewards for the reinforcement learning model, where the higher the ranking of the interaction, the greater the reward. The computing system can further transmit the reward(s) to the reinforcement learning model, which the reinforcement learning model can use as feedback for the effectiveness of the first search result.

The computing system can receive another search from a user, where the computing system determines that the query to the same purchasable item via a GUI. The user can be the same user as the original user, or the user can be a different user. The GUI can be the same GUI as the original GUI or the GUI can be a different GUI. The search does not need to be an exact match for the original search, rather based on the natural language techniques, the computing system can determine that the search is directed toward the same purchasable item. The computing system can again use the reinforcement learning model and access content from the database that describes the items. In this instance, the computing system can use the reward as a guide for selecting different images and different text accessed from the database. The computing system can generate an arrangement of the content for a second search result. The reinforcement learning model has received a reward in response to the user's interaction with the first search result. Therefore, the reinforcement learning model can select different images and different text to maximize the reward it may receive for a second search result. In particular, the computing system can determine the content and an arrangement of the content for the second search result that will maximize the reward. Furthermore, the GUI can be configured to monitor the user's interaction with the second search result. Similar to the above, the GUI can monitor the interactions with the second search result. The computing system can rank the user's interactions with the second search result, and further map the interactions to different rewards based on the ranking. The reinforcement learning model can receive the rewards as feedback on the effectiveness of the second search result. This process can continue to repeat itself and allow the reinforcement learning model to train itself to generate effective search results based on user interactions with the search results.

Embodiments of the present disclosure provide several technical advantages over conventional search result generation techniques. The computing system can use a reinforcement learning technique in which an agent (e.g., the computing system) can learn to take an action (e.g., generate search results) and receive feedback from an environment (e.g., GUI). The computing system can further use the reinforcement learning technique to generate more effective search results. Therefore, unlike a computing system supervised machine learning techniques, the herein computing system can learn to generate effective search results without continuously receiving ground truth data. The computing system can further learn based on experimentation in the environment. For example, the computing system can receive related search queries via ten different GUIs. The computing system can further cause the generation of ten different search results, wherein each search result is displayed on a different GUI. As used herein, the GUI can include a backend system (e.g., a component of the computing system) that can observe the interaction a respective user has with a search result. The computing system can generate a respective reward based on an interaction with each of the ten search results, and transmit the reward to the reinforcement learning model. The reinforcement learning model can use the rewards to identify combinations of images and text that result in the highest rewards. The computing system can continue to experiment and generate new search results using the identified combinations of images and text to increase the effectiveness of the search results. For example, the computing system can generate one search result with two images of an item that surround text describing the item. The computing system can generate another search result that includes the two images below the text describing the item. Therefore, the computing system can explore relationships between information elements of the search result to determine the relationship's effectiveness based on the rewards that correspond to the ranked interactions. Another advantage of the herein described techniques is that a service that generates search results can provide improved GUIs that offer a more enjoyable experience based on current user expectations.

FIG. 1 illustrates an example of a system for reinforcement learning based search results, according to embodiments of the present disclosure. A computing system 100, such as a webserver, can act as an agent in the reinforcement learning process, wherein the computing system can employ a reinforcement learning model 102 to perform an action to experiment on an environment, receive feedback based on the experimentation, and modify the action based on the feedback. As described herein, the action that the reinforcement learning model 102 can perform is selecting a search result arrangement, including selecting any image and text content to be included in the search result. The reinforcement learning model 102 can be guided by a policy 104, wherein the policy is a strategy used by the reinforcement learning model 102. The policy 104 can be to cause the reinforcement learning model 102 to generate a search result that results in a maximum reward.

The computing system 100 can receive a search via a GUI 106 displayed on a computing device 108. The GUI 106 can be managed by the same entity that manages the computing system 100. For example, the entity can operate a suite of servers for offering a web-based environment for a user. The user can use the computing device (e.g., smartphone, laptop, tablet) to access the web-based environment via the GUI 106. The GUI 106 can include a search feature that permits the user to enter a search for one or more items offered via the web-based environment. The search feature can include a search bar that permits a user to type in a search request (e.g., "Do you have a large flat screen television?"). The search feature can also include a hyperlink to items based on a textual item category (e.g., children's board games, holiday specials), or an image of an item or item category (e.g., image of a grill, or image of outdoor cooking items) that the user can click on. In other words, the search can be for a specific product or a product category.

The computing system 100 can receive the search via the GUI 106 and determine an item or category of items that the search is directed toward. If the search is generated based on clicking a textual or image-based hyperlink, then the computing system can be configured to map the search to an item. If the search is based on a user typing in a query, then the computing system 100 can use natural language techniques to determine the item that the search is directed toward. The computing system 100 can provide the reinforcement learning model 102 with an identity of the item.

The reinforcement learning model 102 can then access a search result generator 110 that can include an information element database 112. The information element database 112 can be a relational database that organizes the information element with respect to items. Each item can be associated with a set of image and text information elements. The image information elements can include images of the item (e.g., an image of the item in use, an image of a side view, an image of an exploded view of the item) and text information items (e.g., an available size of a shirt, an available color of a shirt, a material of a shirt, a brand of a shirt). The number of elements associated with an item can be greater than can be reasonably expected to be displayed on a search result. Therefore, the reinforcement learning model 102 can select which information elements to include in a search result.

If the reinforcement learning model 102 has received a reward for a previously generated search result, the reinforcement learning model 102 can use the reward as a guide for selecting the information elements to be displayed on the search result. For example, the reinforcement learning model 102 can map actions to expected rewards and select actions that result in the highest rewards. The actions can include selecting particular elements, particular combinations of information elements, and particular layouts of the information elements for the search result. The expected rewards can be based on past rewards received for employing those particular elements, particular combinations of information elements, and particular layouts of the information elements for the search result for past search results. The reinforcement learning model 102 can use the expected rewards to determine a search result that results in the maximum reward.

If the reinforcement learning model 102 has not previously received a reward (e.g., the search result is the reinforcement learning model 102 first search result), the reinforcement learning model 102 can select the information elements (e.g., images and text) from the information element database 112 without being guided by an expected reward. The reinforcement learning model 102 can further select characteristics for each information element (e.g., image size, image filter, font, character size, underline, bold) without being guided by an expected reward. The reinforcement learning model 102 can further select a layout of the information elements (e.g., an image on the left side of the search result and text on the right side of the search result) without being guided by an expected reward). The reinforcement learning model 102 can further transmit the search result features (e.g., information element(s), information element characteristics, and information element layout) to a search result renderer 114. The search result features can be transmitted as combinations of vectors, text files, and image files.

The search result renderer 114 can receive the search result features and render the search result. The rendering can be a visual depiction of the search result features. The search result generator 110 can transmit the search result to the GUI 106 as a search result in response to the search. The search result can be displayed for the user on a display of the computing device 108.

The GUI 106 allows the user to interact with the search result. For example, the user can click on one or more hyperlinks included in the search result, the user can scroll up and down if the search result to too large to be displayed at once. The GUI 106 can further observe the user's interactions with the search result as the search result is displayed. The interactions can be positive interactions or negative interactions. Whether an observed interaction is positive or negative can be determined by the entity that manages the computing system 100. For example, the GUI 106 can be configured to observe a length of time that the search result is displayed on the GUI 106. A positive interaction can be if the length of time is greater than a threshold length of time. A negative interaction can be if the length of time is less than a threshold length of time. The GUI 106 can observe whether the user used a cursor to hover over an image of the item. The GUI 106 can observe whether the user clicks on a thumbnail image of the item to expand the image. The GUI 106 can observe whether the user clicks on any reviews of the item to expand the image. The GUI 106 can observe whether the user initiated a purchase of the item. The GUI 106 can be configured to observe for any other appropriate interaction with the search result.

The GUI 106 can report a state of the environment to the reinforcement learning model based on the observations. The state can be determined point in time. For example, the user can initiate a session with a webserver, such as the webserver that supports the GUI 106. The user can interact with the search result displayed via the GUI 106. The session can be ended when the user disengages from the GUI 106. In these instances, the GUI 106 can report the state when the user has disengaged from the GUI 106. In other instances, the GUI 106 can, from time to time, report the state based on the observations. For example, in some instances, a user may interact with a search result, disengage from the GUI 106 and return to the search result. The GUI 106 can observe all the interactions with the search result over a time interval, such as a day. The GUI 106 can report the state each time that the user disengages with the GUI 106 over the time interval. Yet in even other instances, the GUI 106 can periodically report a state over a session. The user can be engaged with the search result over a time interval, and the GUI 106 can report a state at sub-intervals. For example, the GUI 106 can be configured to report the state each minute that a user is engaged with a search result.

The GUI 106 can be configured to report one state or multiple states to the reward model 116. For example, the GUI 106 can report a single state, such as, the user purchased the item using the search result. Or the GUI 106 can report the user did not purchase the item using the search result. The GUI 106 can also be configured to report multiple states. For example, in addition to the above example states, the GUI 106 can be configured to also report, for example, the user engaged with an image on the search result, the user did not engage with an image on the search result, or other appropriate states. Each state can be associated with the search result. For example, the search result generator 110 can associate each search result that it generates with a search result identifier. The GUI 106 can transmit the state and the search result identifier pair as a tuple or to the reward model 116.

The reward model 116 can receive state and search result identifier pair as an input and out a reward. The reward model 116 can be a neural network that can implement a reward function to map state and search result identity pairs to a respective reward. Each reward can be a scalar value that is received by the reinforcement learning model 102. The reward can be considered feedback on the effectiveness of the search result. A reward can be a positive reward or a negative reward. For example, if the search result shifts a state from a user not buying an item using the search result to a state of buying the item using the search result the reward can be a positive reward. If, however, the if the search result shifts a state from a user buying an item using the search result to a state of not buying the item using the search result the reward can be a negative reward. The reward model can transmit the reward to the computing system 100. The reward can include the reward value, the state, and the search result identifier.

The reinforcement learning model 102 can use the received reward to guide the generation of a new search result. For example, the reinforcement learning model 102 can select a new set of information elements, select new information element characteristics, or select a new information element layout, while keeping the other of the three the same (e.g., keep set of information elements, change information element characteristics, and keep same layout) for a new search result. After each instance that a search result is presented to a user, the reinforcement learning model 102 can continue to experiment by changing some aspect (e.g., information element, information element characteristics, and layout) of the search result. The reinforcement learning model 102 can further use the positive and negative rewards signals to determine which combinations of the search result aspects result in the maximum positive rewards.

Figure 2:
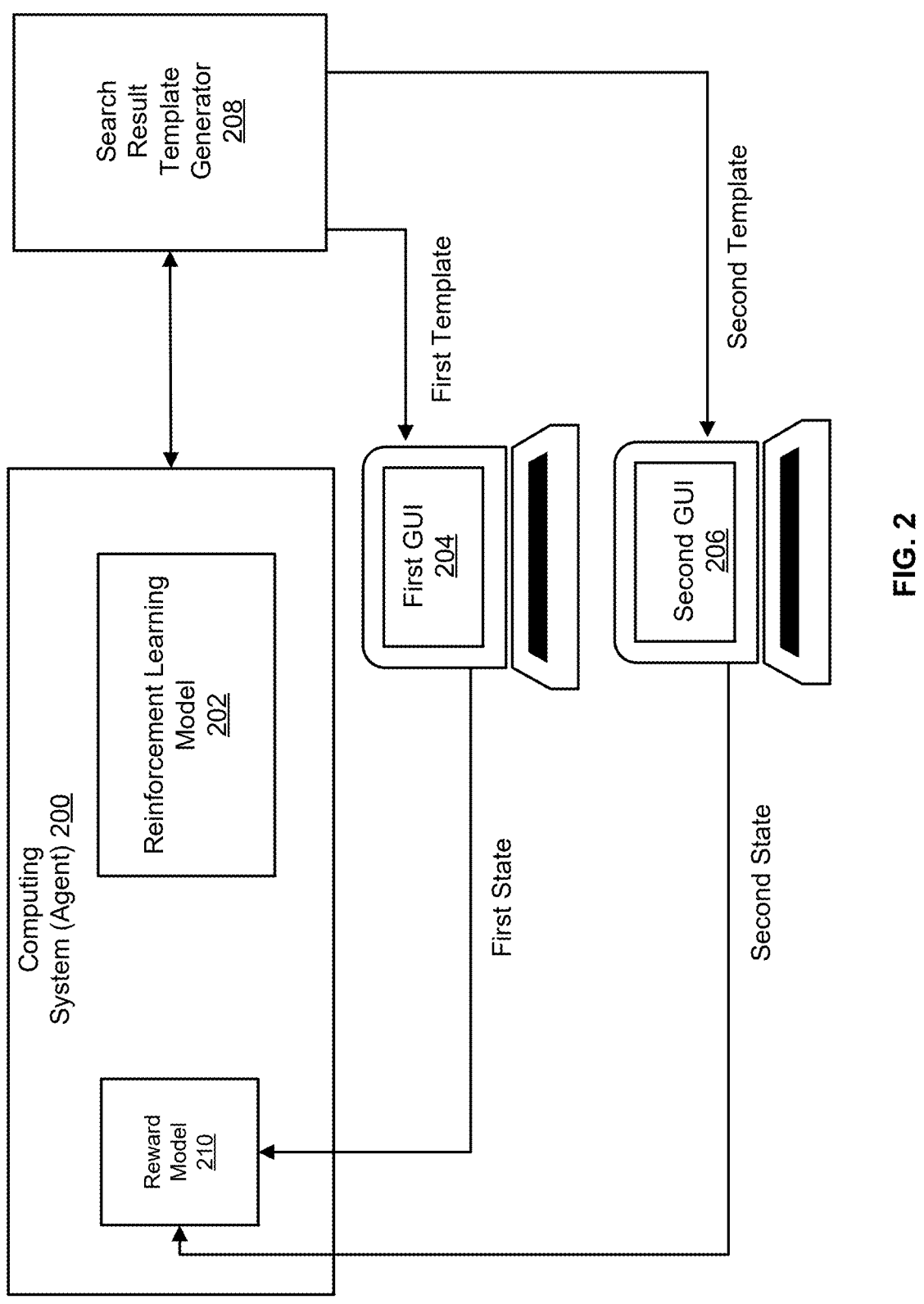
FIG. 2 illustrates an example of a system for reinforcement learning based search results, according to embodiments of the present disclosure.

FIG. 2 illustrates an example of a system for reinforcement learning based search results, according to embodiments of the present disclosure. The herein described reinforcement learning technique for search result generation and evaluation can be applied for multiple search results. As indicated above, a computing system 200 (e.g., the computing system 100) can receive a search from a first GUI 204 (e.g., the GUI 106) and a second GUI 206. The search requests can be contemporaneously received or at distinct times. The computing system 200 can use natural language processing techniques are each of the search requests and determine that the search requests are directed toward the same item. A reinforcement learning model(e.g., the reinforcement learning model 102) can access a search result search result generator 208 (e.g., the search result generator 110) and in particular, an information element database (e.g., the information element database 112) to access information elements associated with the item. However, rather than select a single set of information elements, the reinforcement learning model can select multiple sets of information elements. As illustrated, the computing system 200 has received search queries from the first GUI 204 and the second GUI 206. Therefore, in this illustration, the reinforcement learning model can select a first set of search result features and a second set of search result features. For example, the reinforcement learning model can select a first set of information elements and a second set of information elements. The reinforcement learning model can further select a further set of characteristics for the first set of information elements, and a second set of characteristics for the second set of information elements. The reinforcement algorithm can further select a first layout for the first set of information elements and a second layout for the second set of information elements.

The reinforcement learning model can transmit the search result features to a search result renderer (e.g., the search result renderer 114) of the search result generator 202. The search result renderer can render a first search result based on the first search result features and cause the first search result to be returned to the first GUI 204 as a search result. The search result renderer can render a second search result based on the second search result features and cause the second search result to be returned to the second GUI 206 as a search result. The first GUI 204 and the second GUI 206 can respectively observe interactions between a user and search result. As such, the environment has expanded from the GUI 106 of FIG. 1 to the first GUI 204 and the second GUI 206. The first GUI 204 and the second GUI 206 can respectively determine a state based on the observations and report the state to a reward model 210 (e.g., the reward model 116). As illustrated, the first GUI 204 can report a first state to the reward model 210, and the second GUI 206 can report a second state to the reward model 210. The reward model 210 can use a reward function and generate rewards based on the reported states. For example, the reward model 210 can generate a first reward based on the first state and a second reward based on the second state. The reward model 210 can further transmit the rewards and states to the computing system 200.

The reinforcement learning model can use the rewards and the states to generate a new search result for the item. As indicated above, the reward can be a positive reward or a negative reward. Therefore, there can be four possibilities for the rewards received by the computing system: both a first reward associated with the first search result and a second reward associated with the second search result can be positive rewards, the first reward associated with the first search result can be a positive reward and the second reward associated with the second search result can be a negative reward, the first reward associated with the first search result can be a negative reward and the second reward associated with the second search result can be a positive reward, or both the first reward associated with the first search result and the second reward associated with the second search result can be negative rewards.

If both the first reward associated with the first search result and the second reward associated with the second search result can be positive rewards, the reinforcement learning model can determine similarities between the first and second search results. For example, the reinforcement learning model can determine the similarities and differences in combinations of information elements, information element characteristics, and information element layouts. This can be considered a multi-variate approach, in which the reinforcement leaning model can concurrently determine the relationship of each of the above parameter (e.g., one of an information element, an information element characteristic, and an information element layout) to each of other parameters (e.g., the other of the information element, the information element characteristic, and the information element layout). For example, the reinforcement learning model can determine that both the first search result and the second search result display an image of the item on the left side of the result and text describing the item on the right side of the result. The reinforcement learning model can further determine that both the first search result and the second search result display item reviews using a bold font and on the right side of the screen. The reinforcement learning model can further determine that both the first search result and the second search result display the item reviews next to the item title. However, first search result displays the items reviews above the title, and the second search result displays the item reviews below the item title. This reinforcement learning model can use this multi-variate approach for each time that the reinforcement learning model is mapping a reward to a search result. The reinforcement learning model can reuse those combinations for a subsequent search result. For example, the computing system can receive another group of search queries directed toward the item. In response, the reinforcement learning model can access the select the information elements based on the combinations. For example, the reinforcement learning model can select the same or similar combinations of information elements; the reinforcement learning model can select different information elements, but similar information element characteristics; the reinforcement learning model can select different information elements, different information element characteristics, but similar layouts; or some other combination of information elements, information element characteristics, or layout.

As indicated above, in some instances, either the first reward associated with the first search result or the second reward associated with the second search result is a positive reward, and the other reward is a negative reward. In these instances, the reinforcement learning model can determine the similarities and differences between the first and second search results. However, unlike the example above, in which the reinforcement learning model determines the information elements of the new search result to reuse combinations that are similar in the first search result and second search result, the reinforcement learning model can reuse combinations of information elements in the search result that received a positive reward and discontinue using combinations of information elements in the search result that received the negative reward.

As also indicated above, in some instances, both the first reward associated with the first search result and the second reward associated with the second search result are negative rewards. In these instances, the reinforcement learning model can also determine the similarities and differences between the first and second search results. In these instances, the reinforcement learning model can discontinue use of combinations of information elements in the first search result and the second search result. Rather, the reinforcement learning model can select the combinations of information elements that are not found in the first search result or the second search result.

In any case, the reinforcement learning model can use rewards generated based on multiple search results and use the rewards to determine combinations of information elements across different search results. The greater the number of search results and greater the number of rewards permits the reinforcement learning model to isolate combinations of information elements that result in effective search results. In other words, the larger the environment, the more feedback is provided to the reinforcement learning model in the form of rewards. The complexity of the reinforcement learning model required to analyze the different rewards in relation to the different search results can lead to an increased probability that the reinforcement learning model can select information elements that are effective at executing the policy (104).

Figure 3:
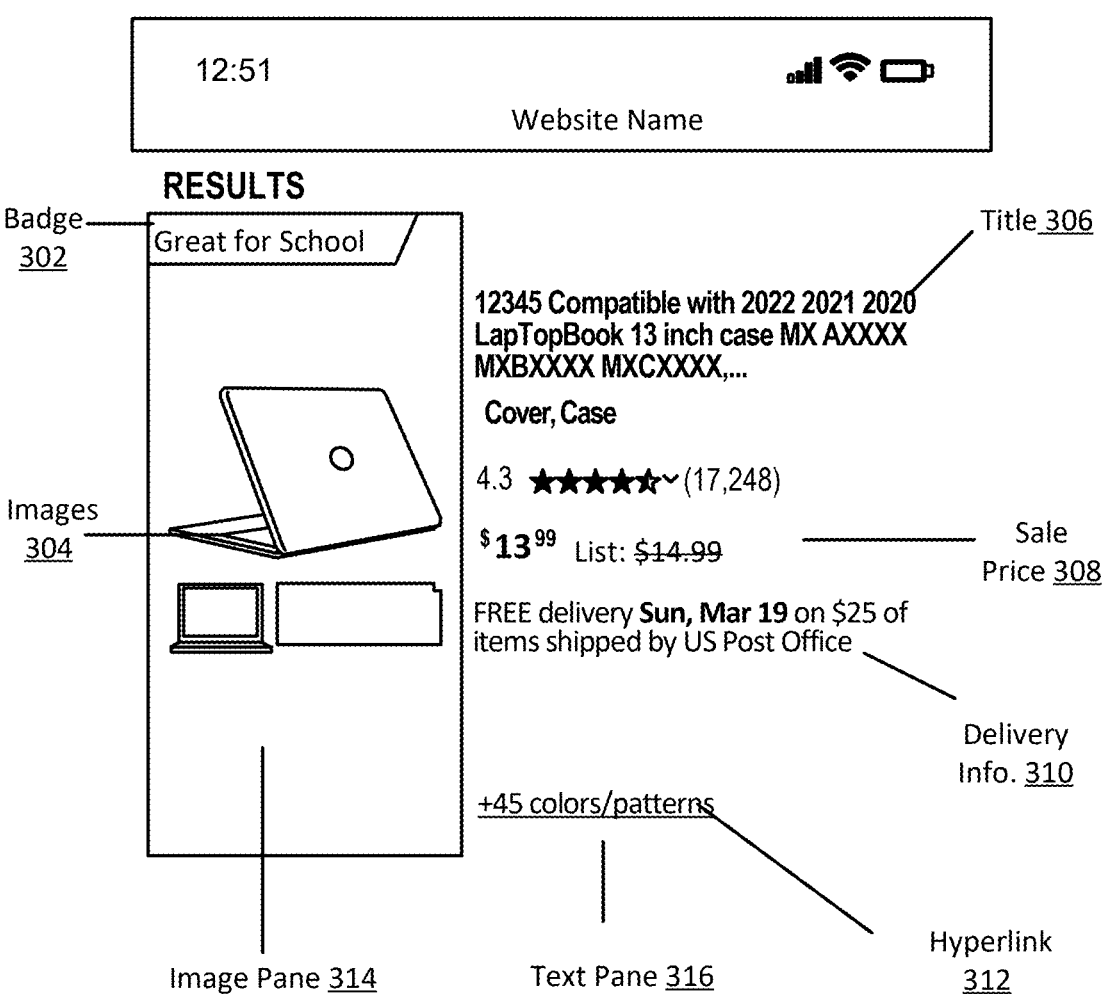
FIG. 3 illustrates an example search result, according to embodiments of the present disclosure.

FIG. 3 illustrates an example search result 300, according to embodiments of the present disclosure. As indicated above, the computing system (e.g., the computing system 100) can receive a search and use natural language processing techniques to determine an item associated with the search. For example, the search can be, "Great laptop for college"). The computing system can determine that the search is directed toward a laptop computer and indicate the determined item to the reinforcement learning model (e.g., the reinforcement learning model 102. The reinforcement learning model can access an information element database (e.g., the information element database 112), and in particular information elements associated with a laptop. The reinforcement learning model can select information elements for the search result 300. For example, the reinforcement learning model a subset of the information elements associated with the laptop for display on the search result 300. The reinforcement learning model can select characteristics for the information elements. The reinforcement learning model can select a layout for the information elements. As illustrated, the reinforcement learning model has selected multiple information elements for the search result 300 including an item badge 302, item images 304, an item title 306, an item sale price 308, an item delivery information 310. The reinforcement learning model has also selected characteristics for the information elements. As illustrated, the reinforcement learning model has selected the item title 306 is displayed in a bold font. The reinforcement learning model selected item colors and patterns, and chose to include a hyperlink 312 to these features rather than display all of the colors and patterns. The reinforcement learning model further selected to include a visual cross through for the retail price of $14.99 as part of the sale price 308. The reinforcement learning model also selected a layout for the search result 300. As illustrated, the reinforcement learning model the reinforcement learning model has selected an image pane 314 laid out side by side with a text pane 316. The image pane includes the images 304 of the item, while the text pane 316 includes textual descriptions of the items. It should be appreciated that the reinforcement learning model could have selected different information element features. For example, referring back to FIG. 2, the reinforcement learning model could have selected different information elements, different characteristics for the information elements, and different layouts for the first search result and the second search result.

Figure 4:
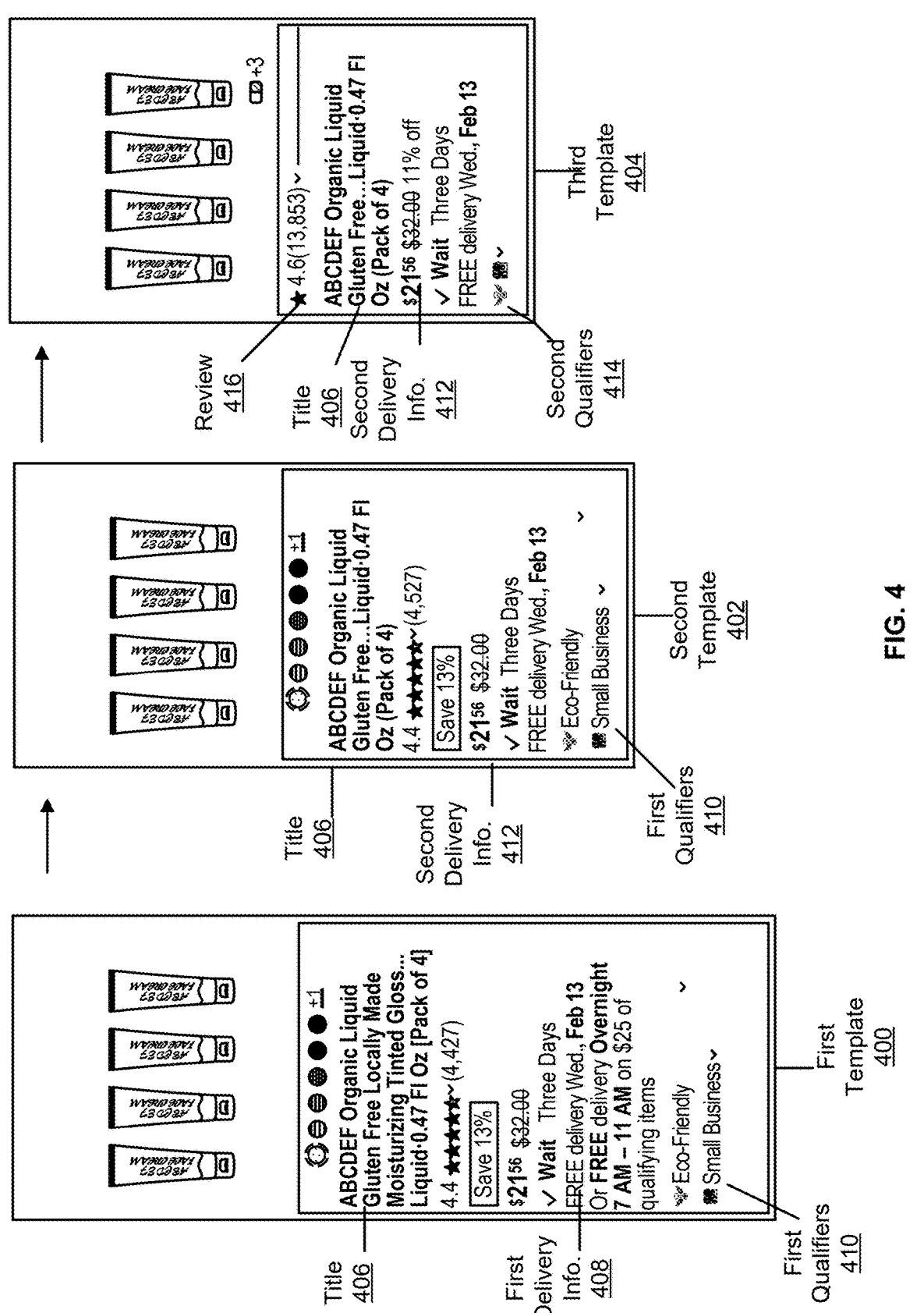
FIG. 4 illustrates an example set of search result iterations for an item, according to embodiments of the present disclosure.

FIG. 4 illustrates an example set of search result iterations for an item, according to embodiments of the present disclosure. As indicated above, the reinforcement learning model (e.g., the reinforcement learning model 102) can select the first information elements in response to receiving a first search directed toward an item. The first information elements can be rendered into a search result and displayed on a GUI. The reinforcement learning model can further receive feedback in the form of a reward that can be used to guide the selection of subsequent information element features.

As illustrated, each of the first search result 400, the second search result 402, and the third search result 404 are directed toward the same item (e.g., tinted lip gloss). The reinforcement learning model can select information elements for the first search result 400. The information elements can include a title 406, first delivery information 408, and first qualifiers. The title 406 can include a descriptive title of the item. The first delivery information 408 can include an expected delivery date and an expedited delivery date based on an aggregate purchase amount. The first qualifiers 410 can each include a visual badge and a text description of the qualifier. The search result can be presented to multiple users via respective GUIs (e.g., the first GUI 204 and the second GUI 206). The GUIs can observe each users respective interactions with the search result and determine a state based on the interactions. For example, each GUI can determine whether the first search result resulted in the user purchasing the item (e.g., tinted lip gloss). Each GUI can transmit the determined states to a reward model (e.g., reward model 116). The reward model can transmit respective rewards and states to the computing system (e.g., the computing system 100), which can provide the rewards and states to the reinforcement learning model. The reinforcement learning model can receive a second search directed toward the item. Based on expected rewards and the receiving the second search, the reinforcement learning model can select second information elements for the second search result 402. As illustrated, the second search result 402 includes the title 406, the second delivery information 412 and the first qualifiers 410. The reinforcement learning model reused the information elements for the title 406 and the first qualifiers 410, and changed the information elements for the delivery information. As illustrated, the second delivery information 412 does not include an expedited delivery date based on an aggregate purchase amount. This does not suggest that there is no expedited delivery date based on an aggregate purchase amount, rather the reinforcement learning model has chosen not to display the expedited delivery date to improve the effectiveness of the search result. The GUIs observe the interaction between users and the second search result 402. The GUIs can transmit a state based on the observations to a rewards assessor that can transmit rewards and states to the computing system. The computing system can provide the rewards and states to the reinforcement learning model. The reinforcement learning model can receive a third search directed toward the item. Based on expected rewards and the receiving the third search, the reinforcement learning model can select third information elements for the third search result 404. As illustrated, the third search result 404 includes the title 406, the second delivery information 412 and the second qualifiers 414. The reinforcement learning model reused the information elements for the title 406 and the second delivery information 412, and changed the information elements for the qualifiers. As illustrated, the second qualifiers only include visual badges and exclude the textual descriptions. In addition, it is illustrated that the reinforcement learning model changed the layout for the third search result. Each of the first search result 400, the second search result 402, and the third search result 404 include an image pane over a text pane layout. The third search result 404 includes a modified text pane layout. The reviews 416 are arranged above the title 406, rather than below the title 406 as in FIGS. 1 and 2. It should be appreciated that even though FIG. 4 illustrates a reduction in information elements for successive search results, in some instances the reinforcement learning model can add one or more information elements for successive search results.

The techniques described herein can rely on neural combinatorial optimization, in which neural networks and reinforcement learning can be used to solve non-deterministic polynomial time hardness (NP Hard) problems. Reinforcement learning can be used to define the environment (e.g., a universe of GUIs displaying search results) and an agent (e.g., a computing system that employs a reinforcement learning model guided by a policy). The reinforcement learning model (e.g., the reinforcement learning model 102) can be built using two approaches. The first approach can be to use reinforcement learning pretraining in which a training set of search results can be used to optimize a neural network, such as a recurrent neural network (RNN). The RNN can learn to express a policy (e.g., the policy 104) over solutions based on rewards. At inference, the RNN can select information elements based on a greedy decoding method, in which the RNN selects features based on a highest expected reward. A second approach can be an active search, which starts with a random policy and iteratively optimizes the RNN features on a single test search result, while keeping track of the best search result based on reward.

The reinforcement learning model can select information elements based on a Markov Decision Process (MDP), which can be defined as a collection of states, actions, transition probabilities, and discount factors. The MDP provides a framework for decision-making problems using actions and rewards. The reinforcement learning model can further use the MDP to determine the transition function that defines a probability of transitioning from one state to another state. The reinforcement learning models goal is to use the MDP to maximize the reward when following a policy (e.g., the policy 104). The entity managing the reinforcement learning model can define a set of neural network features (e.g., coefficients, weights, and biases) to parameterize the policy. The reinforcement learning model can iterate the search results until it determines the features that maximize the reward. Or in other words, the reinforcement learning model can continue to perform actions such as selecting information elements for new search results, until the actions lead to a state that maximizes the reward.

The reinforcement learning model can learn which actions yield the maximum reward by calculating policy gradients. One approach for determining the policy gradient is a proximal policy optimization (PPO). Using PPO, the reinforcement learning model can calculate an update to the policy gradient that minimizes a cost function and seek to keep a deviation from a previous policy relatively small. By keeping the deviation in policy relatively small, PPO maintains a low variance in policy and helps simplify the training process.

One aspect of rewards is short term rewards vs long term rewards. The reinforcement learning model can be tuned to configured for both short t-term rewards and long term rewards. In reinforcement learning, rewards (Rs) can be represented as $R_t + R_{t+1} + R_{t+2} + \ldots + R_{t+N-1}$, in which the computing system (agent) reaches its search result goal at step N. These sessions can sometimes be referred to as episodes. One issue for reinforcement learning is that n can equal or approach infinity. Therefore, a discount factor (e.g., a number between 0 and 1) can be introduced to address this issue. Using the discount factor the sum of the rewards can be scaled down, in which the discounted sum of the rewards is known as a return. By adjusting the discount factor to a value between 0 and 1, the entity managing the computing system can change the focus of the computing system between short-term rewards and long-term rewards. For example, if the discount factor is set to 0, then the focus of the computing system will be the immediate short-term reward as subsequent rewards will be zeroed out. If, however, the discount factor is set to 1, the focus of the computing system will be the long-term reward. Therefore, the discount factor can be configured to be between 0 and 1. A reward R that occurs N steps in the future from the current state, is multiplied by the discount factor^N to describe its importance to the current state. For example, a discount factor can be 0.8 and a reward can be 5 that is 3 steps ahead of the current state. The importance of this reward to the computing system is equal to $(0.8^3)*5=2.56$. If the reward were 4 steps into the future, the importance would be 2.048. In other words, the importance of the reward decreases further and further out into the future.

FIG. 5 is a process flow 500 generating a search result, according to embodiments of the present disclosure. At 502, the method can include a computing system receiving, via a first graphical user interface (GUI) at a first device, a first search for an item.

At 504, the method can include the computing system accessing a reinforcement learning model to generate a first search result.

At 506, the method can include the computing system accessing, via the reinforcement learning model, a database that stores information elements about the item.

At 508, the method can include the computing system generating, via the reinforcement learning model, a first arrangement of a first subset of the information elements.

At 510, the method can include a computing system causing the first subset of information elements to be presented according to the first arrangement as a first search result via the first GUI.

At 512, the method can include a computing system receiving, via the first GUI, a state associated with the first arrangement.

At 514, the method can include a computing system generating a first reward associated with the first arrangement based at least in part on the state. The computing system can generate the first reward based on using a reward model and the state to determine a value associated with the first search result, and in particular the actions used to generate the first arrangement.

At 516, the method can include a computing system causing a change of weights of the reinforcement learning model based at least in part on the first reward. The computing system can cause the change of weights based on determining whether the first reward is a positive reward or a negative reward. The computing system can further use a policy gradient technique, such as PPO to update the policy by changing the weights of the reinforcement learning model based on whether the first reward is a positive reward or a negative reward.

At 518, the method can include a computing system receiving, via a second GUI at a second device, a second search for the item.

At 520, the method can include a computing system causing, by using the reinforcement learning model and the database, the generation of a second arrangement based on the change of weights. The second result can include at least one of: a different arrangement of the first subset of information elements, different characteristics of the subset of information elements, or a different subset of the item information elements.

At 522, the method can include a computing system causing the second search result to be presented via the second GUI.

FIG. 6 is a process flow 600 generating a search result, according to embodiments of the present disclosure. At 602, the method can include a computing system receiving, via a first graphical user interface (GUI) at a first device, a first search for an item.

At 604, the method can include the computing system accessing a reinforcement learning model to generate a first search result. The method can include the computing system, via the reinforcement learning model accessing a database that stores information elements about the item. The method can further include the computing system, via the reinforcement learning model can further generate a first arrangement of a first subset of the information elements to use in the first search result.

At 606, the method can include a computing system causing the first search result to be presented via the first GUI. A presentation of the first search result shows the first arrangement.

At 608, the method can include a computing system receiving, via the first GUI, a state associated with the first search result.

At 610, the method can include a computing system generating a first reward associated with the first search result based at least in part on the state.

At 612, the method can include a computing system causing a change of weights of the reinforcement learning model based at least in part on the first reward.

At 614, the method can include a computing system receiving, via a second GUI at a second device, a second search for the item. The computing system can cause follow various paths for changing the weights of the reinforcement learning model. For each path, the computing system can use a multi-variate approach to concurrently determine similarities and differences between each of the above parameter (e.g., one of an information element, an information element characteristic, and an information element layout) to each of other parameter (e.g., the other of the information element, the information element characteristic, and the information element layout) of the search results.

In a first path, the first reward can be a positive reward. The computing system can receive, via the second GUI, a second state associated with the second search result. The second state can be based on an interaction, at the second GUI, with the second search result. The computing system can generate a second reward, a positive reward, associated with the second search result based at least in part on the second state. The computing system can determine common information elements of the first search result and the second search result. The computing system can cause a change of weights of the reinforcement learning model to increase a probability that the reinforcement learning model causes a generation of a third search result in response to a search for the item to include the common features.

In a second path, the first reward can be a positive reward. The computing system can receive, via the second GUI, a second state associated with the second search result. The second state can be based on an interaction, at the second GUI, with the second search result. The computing system can generate a second reward, a negative reward, associated with the second search result based at least in part on the second state. The computing system can determine the information elements of the first search result distinct from information elements of the second search result. The computing system can determine the information elements of the second search result distinct from information elements of the first search result. The computing system can cause a change of weights of the reinforcement learning model to increase a probability that the reinforcement learning model causes a generation of a third search result in response to a search for the item to include the information elements of the first search result distinct from information elements of the second search result, and to exclude information elements of the second search result distinct from information elements of the first search result.

In a third path, the first reward can be a negative reward. The computing system can receive, via the second GUI, a second state associated with the second search result, wherein the second state is based on an interaction, at the second GUI, with the second search result. The computing system generate a second reward, a positive reward, associated with the second search result based at least in part on the second state. The computing system can determine the information elements of the first search result distinct from information elements of the second search result. The computing system can determine the information elements of the second search result distinct from information elements of the first search result. The computing system can cause a change of weights of the reinforcement learning model to increase a probability that the reinforcement learning model causes a generation of a third search result in response to a search for the item to include the information elements of the second search result distinct from information elements of the first search result, and to exclude information elements of the first search result distinct from information elements of the second search result.

In a fourth path, the first reward can be a negative reward. The computing system can receive, via the second GUI, a second state associated with the second search result, wherein the second state is based on an interaction, at the second GUI, with the second search result. The computing system can generate a second reward, a negative reward, associated with the second search result based at least in part on the second state, wherein the second reward is a negative reward. The computing system can determine common information elements of the first search result and the second search result. The computing system can cause a change of weights of the reinforcement learning model to increase a probability that the reinforcement learning model causes a generation of a third search result in response to a search for the item to exclude the common features.

In a fifth path, the first reward can be a positive reward. The computing system can receive, via the second GUI, a second state associated with the second search result. The second state can be based on an interaction, at the second GUI, with the second search result. The computing system can generate a second reward, a positive reward associated with the second search result based at least in part on the second state, wherein the second reward is a positive reward. The computing system can determine that a distinction between the first search result and the second search result is that the second search result comprises a greater number of information elements displayed on the second GUI than a number of information elements of first search result displayed on the first GUI. The computing system can determine common displayed information elements displayed of the first search result and the second search result. The computing system can cause a change of weights of the reinforcement learning model to increase a probability that the reinforcement learning model causes a generation of a third search result in response to a search for the item to include the common displayed information elements displayed of the first search result and the second search result.

In a sixth path, the first reward is a positive reward. The computing system can receive, via the second GUI, a second state associated with the second search result, wherein the second state is based on an interaction, at the second GUI, with the second search result. The computing system can generate a second reward associated with the second search result based at least in part on the second state, wherein the second reward is a positive reward. The computing system can determine common information elements, common information element characteristics, and a common layout between the first search result and the second search result. The computing system can cause a change of weights of the reinforcement learning model to increase a probability that the reinforcement learning model causes a generation of a third search result in response to a search for the item to include distinct information elements, distinct information element characteristics, or distinct layouts between the first search result and the second search result.

In a seventh path, the first reward is a positive reward. The computing system can receive, via the second GUI, a second state associated with the second search result, wherein the second state is based on an interaction, at the second GUI, with the second search result. The computing system can generate a second reward, a negative reward, associated with the second search result based at least in part on the second state. The computing system can determine distinct information elements, distinct information element characteristics, and distinct layouts between the first search result and the second search result. The computing system can cause a change of weights of the reinforcement learning model to increase a probability that the reinforcement learning model causes a generation of a third search result in response to a search for the item to include common information elements, common information element characteristics, or a common layout between the first search result and the second search result.

In an eight path, the first reward is a negative reward. The computing system can receive, via the second GUI, a second state associated with the second search result, wherein the second state is based on an interaction, at the second GUI, with the second search result. The computing system can generate a second reward, a negative reward, associated with the second search result based at least in part on the second state, wherein the second reward is a negative reward. The computing system can determine common information elements, common information element characteristics, and a common layout between the first search result and the second search result. The computing system can cause a change of weights of the reinforcement learning model to increase a probability that the reinforcement learning model causes a generation of a third search result in response to a search for the item to include distinct information elements, distinct information element characteristics, or distinct layouts between the first search result and the second search result.

In ninth path, the first reward is a positive reward. The computing system can receive, via the second GUI, a second state associated with the second search result, wherein the second state is based on an interaction, at the second GUI, with the second search result. The computing system can generate a second reward associated with the second search result based at least in part on the second state, wherein the second reward is a positive reward, and wherein the first reward has a greater value than a value of the second reward. The computing system can determine the information elements of the first search result that are distinct from information elements of the second search result. The computing system can cause a change of weights of the reinforcement learning model to increase a probability that the reinforcement learning model causes a generation of a third search result in response to a search for the item to include the determine distinct information elements of the first search result.

In a tenth path, the first reward is a positive reward. The computing system can receive, via the second GUI, a second state associated with the second search result, wherein the second state is based on an interaction, at the second GUI, with the second search result. The computing system can generate a second reward associated with the second search result based at least in part on the second state, wherein the second reward is a positive reward, and wherein the first reward has a same value as the second reward. The computing system can determine common information elements, common information element characteristics between the first search result and the second search result. The computing system can cause a change of weights of the reinforcement learning model to increase a probability that the reinforcement learning model causes a generation of a third search result in response to a search for the item to include distinct information elements or distinct information element characteristics between the first search result and the second search result.

At 616, the method can include a computing system causing, by using the reinforcement learning model and the database, generation of a second search result based on the change of weights. The second result can include at least one of: a different arrangement of the first subset of information elements, different characteristics of the subset of information elements, or a different subset of the item information elements.

At 618, the method can include a computing system causing the second search result to be presented via the second GUI.

FIG. 7 is a process flow 700 generating a search result, according to embodiments of the present disclosure. At 702, the method can include a computing system receiving, via a first graphical user interface (GUI) at a first device, a first search for an item.

At 704, the method can include determining whether the first device is a mobile device or a desktop device.

At 706, the method can include the computing system accessing a reinforcement learning model to generate a first search result. The method can include the computing system, via the reinforcement learning model accessing a database that stores information elements about the item. The method can further include the computing system, via the reinforcement learning model can further generate a first arrangement of a first subset of the information elements to use in the first search result. The first search result can be configured for display on the determined mobile device type or desktop device type.

At 708, the method can include a computing system causing the first search result to be presented via the first GUI. A presentation of the first search result can show the first arrangement.

At 710, the method can include a computing system receiving, via the first GUI, a state associated with the first search result. The first state can be based on an interaction with the first search result.

At 712, the method can include a computing system generating a first reward associated with the first search result based at least in part on the first state.

At 714, the method can include a computing system causing a change of weights of the reinforcement learning model based at least in part on the first reward.

At 716, the method can include a computing system receiving, via a second GUI at a second device, a second search for the item. The second device can also be the determined mobile device type or desktop device type.

At 718, the method can include a computing system causing, by using the reinforcement learning model and the database, generation of a second search result based on the change of weights. The second result can include at least one of: a different arrangement of the first subset of information elements, different characteristics of the subset of information elements, or a different subset of the item information elements, based at least in part on the second device being a same device type as the first device.

At 720, the method can include a computing system causing the second search result to be presented via the second GUI.

The computing system of FIG. 7 is similar to the computing system of FIG. 6, in that the computing system of FIG. 7 can follow the same paths of FIG. 6. However, the search results are based on a device type. One having ordinary skill in the art can be aware that a search result on a mobile device can appear different than a search result on a desktop device. For example, the search result displayed on a mobile device may display fewer information elements than the search result displayed on the desktop. Therefore, when comparing states, the result from action to generate search results, the reinforcement learning model can take into consideration whether a search result was displayed on a mobile device or a laptop. For example, the reinforcement learning model can compare rewards, and generate search results based on device type. The reinforcement learning model can further take into consideration an expected reward based on a device type that the search result is to be displayed.

Figure 8:
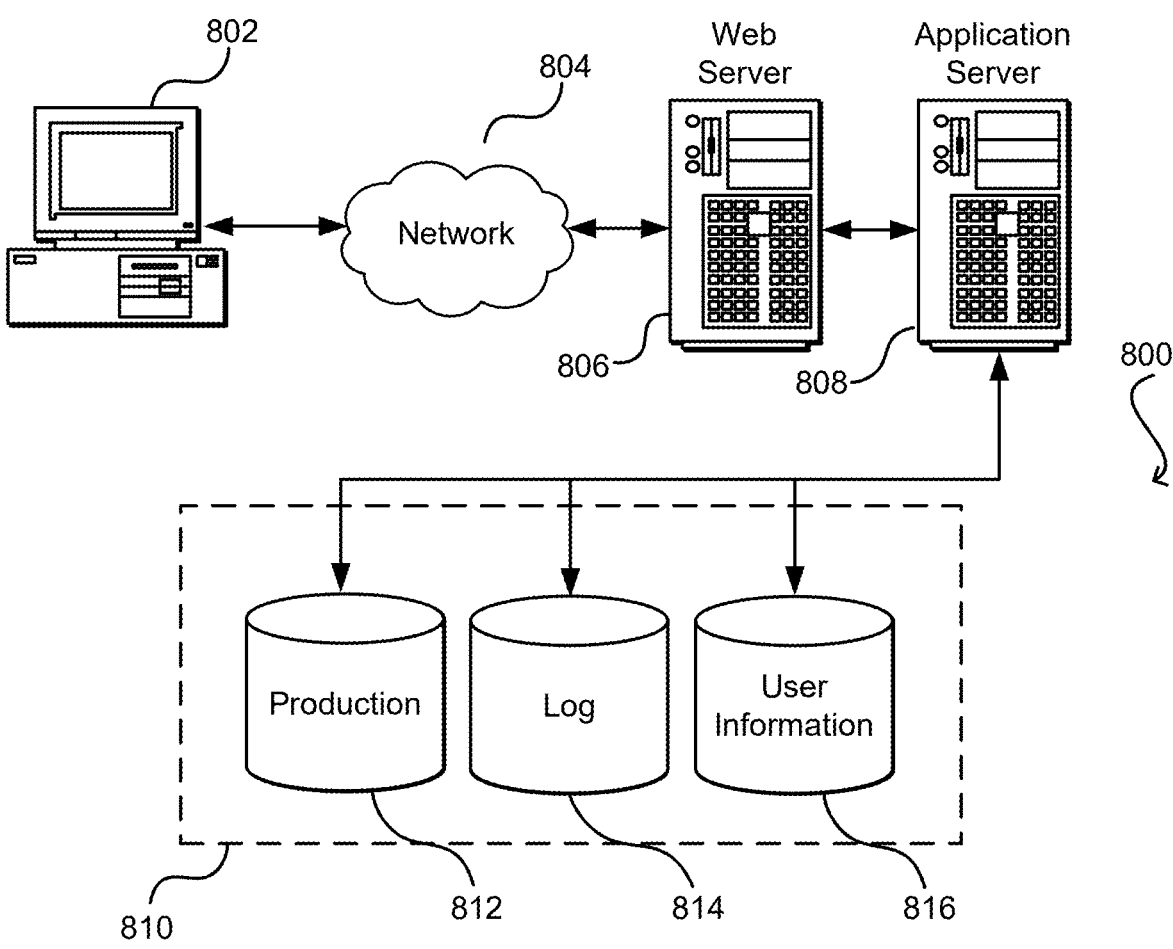
FIG. 8 illustrates an environment in which various embodiments can be implemented.

FIG. 8 illustrates aspects of an example environment 800 for implementing aspects in accordance with various embodiments. As will be appreciated, although a Web-based environment is used for purposes of explanation, different environments may be used, as appropriate, to implement various embodiments. The environment includes an electronic client device 802, which can include any appropriate device operable to send and receive requests, messages, or information over an appropriate network 804 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 806 for receiving requests and serving content in response thereto, although for other networks an alternative device serving a similar purpose could be used as would be apparent to one of ordinary skill in the art.

In some examples, cell phones (or, more broadly, mobile phones) may be one specific type of mobile device that is an example of the electronic client device 802. In some instances, a user's mobile device may be considered their primary client device. Other example mobile devices include wearables, such as watches, worn sensors (e.g., rings, bracelets, etc.), cameras, eyeglasses, and the like, which may be considered "connected" auxiliary devices. In some examples, the combination of a user's primary mobile device and all or some of their connected, auxiliary devices, may make up a single mobile system configured to communicate with the Web server 806 or other servers over the network 804 or other networks.

The illustrative environment includes at least one application server 808 and a data store 810. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 802 and the application server 808, can be handled by the Web server. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing production data 812 and user information 816, which can be used to serve content for the production side. The data store also is shown to include a mechanism for storing log data 814, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infra-red network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method performed by a computing system, the method comprising:

receiving, via a first graphical user interface (GUI) at a first device, a first search for an item;

accessing a reinforcement learning model to generate a first search result, wherein the reinforcement learning model is configured to:

access a database that stores information elements about the item, and generate a first arrangement of a first subset of the information elements;

causing the first subset of the information elements to be presented according to the first arrangement as a first search result via the first GUI;

receiving, via the first GUI, a state associated with the first arrangement;

determining an association between the first arrangement of the first subset of the information elements and the state;

generating a first machine learning model reward based at least in part on the association;

causing a change of weights of the reinforcement learning model based at least in part on the first machine learning model reward;

receiving, via a second GUI at a second device, a second search for the item;

causing, by using the reinforcement learning model and the database, generation of a second arrangement based on the change of weights, the second arrangement including at least one of: a different positioning of the first subset of the information elements, different characteristics of the first subset of the information elements, or a different subset of the information elements;

causing a second search result to be presented according to the second arrangement via the second GUI; and storing data indicating that the second arrangement is to be used as a search result.

2. The method of claim 1, wherein generating the first machine learning model reward associated with the first arrangement comprises:

determining, using a reward model and based on the state, a value associated with generating the first arrangement of the first subset of the information elements, wherein the first machine learning model reward comprises the value.

3. The method of claim 1, wherein causing the change of weights of the reinforcement learning model based at least in part on the first machine learning model reward comprises:

determining whether the first machine learning model reward is a positive machine learning model reward associated with generating the first arrangement or a negative machine learning model reward associated with generating the first arrangement; and causing, using proximal policy optimization (PPO), the change of weights of the reinforcement learning model based on whether generating the first arrangement is associated with a positive machine learning model reward or a negative machine learning model reward.

4. A computing system comprising:

one or more processors; and one or more computer-readable media having stored thereon a sequence of instructions, when executed, cause the one or more processors to:

receive, via a first graphical user interface (GUI) at a first device, a first search for an item;

access a reinforcement learning model to generate a first search result, the first search result comprising an image of an item;

cause the first search result to be presented via the first GUI;

receive, via the first GUI, a first state associated with the first search result, wherein the first state is based on an interaction, at the first GUI, with the first search result;

determine an association between the image and the first state;

generate a first machine learning model reward for changing of weights of the reinforcement learning model based at least in part on the association;

cause a change of weights of the reinforcement learning model based at least in part on the first machine learning model reward;

receive, via a second GUI at a second device, a second search for the item;

cause, by using the reinforcement learning model, generation of a second search result based on the change of weights; and cause the second search result to be presented via the second GUI.

5. The computing system of claim 4, wherein the first machine learning model reward is a positive machine learning model reward, and wherein the sequence of instructions which, when executed, cause the one or more processors to:

receive, via the second GUI, a second state associated with the second search result, wherein the second state is based on an interaction, at the second GUI, with the second search result;

generate a second machine learning model reward associated with the second search result based at least in part on the second state, wherein the second machine learning model reward is a positive machine learning model reward;

determine, using a multi-variate approach, common information elements of the first search result and the second search result; and cause a change of weights of the reinforcement learning model to increase a probability that the reinforcement learning model causes a generation of a third search result in response to a search for the item to include the common information elements.

6. The computing system of claim 4, wherein the first machine learning model reward is a positive machine learning model reward, and wherein the sequence of instructions which, when executed, cause the one or more processors to:

receive, via the second GUI, a second state associated with the second search result, wherein the second state is based on an interaction, at the second GUI, with the second search result;

generate a second machine learning model reward associated with the second search result based at least in part on the second state, wherein the second machine learning model reward is a negative machine learning model reward;

determine, using a multi-variate approach, information elements of the first search result distinct from information elements of the second search result;

determine, using a multi-variate approach, information elements of the second search result distinct from information elements of the first search result; and cause a change of weights of the reinforcement learning model to increase a probability that the reinforcement learning model causes a generation of a third search result in response to a search for the item to include the information elements of the first search result distinct from information elements of the second search result, and to exclude information elements of the second search result distinct from information elements of the first search result.

7. The computing system of claim 4, wherein the first machine learning model reward is a negative machine learning model reward, and wherein the sequence of instructions, when executed, cause the one or more processors to:

receive, via the second GUI, a second state associated with the second search result, wherein the second state is based on an interaction, at the second GUI, with the second search result;

generate a second machine learning model reward associated with the second search result based at least in part on the second state, wherein the second machine learning model reward is a positive machine learning model reward;

determine first information elements of the first search result distinct from second information elements of the second search result; and cause a change of weights of the reinforcement learning model to increase a probability that the reinforcement learning model causes a generation of a third search result in response to a search for the item to include the second information elements, and to exclude the first information elements.

8. The computing system of claim 4, wherein the first machine learning model reward is a negative machine learning model reward, and wherein the sequence of instructions, when executed, cause the one or more processors to:

receive, via the second GUI, a second state associated with the second search result, wherein the second state is based on an interaction, at the second GUI, with the second search result;

generate a second machine learning model reward associated with the second search result based at least in part on the second state, wherein the second machine learning model reward is a negative machine learning model reward;

determine, using a multi-variate approach, common information elements of the first search result and the second search result; and cause a change of weights of the reinforcement learning model to increase a probability that the reinforcement learning model causes a generation of a third search result in response to a search for the item to exclude the common information elements.

9. The computing system of claim 4, wherein the first machine learning model reward is a positive machine learning model reward, and wherein the sequence of instructions, when executed, cause the one or more processors to:

receive, via the second GUI, a second state associated with the second search result, wherein the second state is based on an interaction, at the second GUI, with the second search result;

generate a second machine learning model reward associated with the second search result based at least in part on the second state, wherein the second machine learning model reward is a positive machine learning model reward;

determine that a distinction between the first search result and the second search result is that the second search result comprises a greater number of information elements displayed on the second GUI than a number of information elements of the first search result displayed on the first GUI;

determine common displayed information elements displayed of the first search result and the second search result; and cause a change of weights of the reinforcement learning model to increase a probability that the reinforcement learning model causes a generation of a third search result in response to a search for the item to include the common displayed information elements.

10. The computing system of claim 4, wherein the first machine learning model reward is a positive machine learning model reward, and wherein the sequence of instructions, when executed, cause the one or more processors to:

receive, via the second GUI, a second state associated with the second search result, wherein the second state is based on an interaction, at the second GUI, with the second search result;

generate a second machine learning model reward associated with the second search result based at least in part on the second state, wherein the second machine learning model reward is a positive machine learning model reward;

determine common information elements, common information element characteristics, and a common layout between the first search result and the second search result; and cause a change of weights of the reinforcement learning model to increase a probability that the reinforcement learning model causes a generation of a third search result in response to a search for the item to include distinct information elements, distinct information element characteristics, or distinct layouts between the first search result and the second search result.

11. The computing system of claim 4, wherein the first machine learning model reward is a positive machine learning model reward, and wherein the sequence of instructions, when executed, cause the one or more processors to:

receive, via the second GUI, a second state associated with the second search result, wherein the second state is based on an interaction, at the second GUI, with the second search result;

generate a second machine learning model reward associated with the second search result based at least in part on the second state, wherein the second machine learning model reward is a negative machine learning model reward;

determine distinct information elements, distinct information element characteristics, and distinct layouts between the first search result and the second search result; and cause a change of weights of the reinforcement learning model to increase a probability that the reinforcement learning model causes a generation of a third search result in response to a search for the item to include common information elements, common information element characteristics, or a common layout between the first search result and the second search result.

12. The computing system of claim 4, wherein the first machine learning model reward is a negative machine learning model reward, and wherein the sequence of instructions, when executed, cause the one or more processors to:

receive, via the second GUI, a second state associated with the second search result, wherein the second state is based on an interaction, at the second GUI, with the second search result;

generate a second machine learning model reward associated with the second search result based at least in part on the second state, wherein the second machine learning model reward is a negative machine learning model reward;

determine common information elements, common information element characteristics, and a common layout between the first search result and the second search result; and cause a change of weights of the reinforcement learning model to increase a probability that the reinforcement learning model causes a generation of a third search result in response to a search for the item to include distinct information elements, distinct information element characteristics, or distinct layouts between the first search result and the second search result.

13. The computing system of claim 4, wherein the first machine learning model reward is a positive machine learning model reward, and wherein the sequence of instructions, when executed, cause the one or more processors to:

receive, via the second GUI, a second state associated with the second search result, wherein the second state is based on an interaction, at the second GUI, with the second search result;

generate a second machine learning model reward associated with the second search result based at least in part on the second state, wherein the second machine learning model reward is a positive machine learning model reward, and wherein the first machine learning model reward has a greater value than a value of the second machine learning model reward;

determine information elements of the first search result that are distinct from information elements of the second search result; and cause a change of weights of the reinforcement learning model to increase a probability that the reinforcement learning model causes a generation of a third search result in response to a search for the item to include the determined information elements of the first search result that are distinct from information elements of the second search result.

14. The computing system of claim 4, wherein the first machine learning model reward is a positive machine learning model reward, and wherein the sequence of instructions, when executed, cause the one or more processors to:

receive, via the second GUI, a second state associated with the second search result, wherein the second state is based on an interaction, at the second GUI, with the second search result;

generate a second machine learning model reward associated with the second search result based at least in part on the second state, wherein the second machine learning model reward is a positive machine learning model reward, and wherein the first machine learning model reward has a same value as the second machine learning model reward;

determine common information elements, common information element characteristics between the first search result and the second search result; and cause a change of weights of the reinforcement learning model to increase a probability that the reinforcement learning model causes a generation of a third search result in response to a search for the item to include distinct information elements or distinct information element characteristics between the first search result and the second search result.

15. One or more non-transitory, computer-readable media having stored thereon a sequence of instructions, when executed, cause one or more processors to:

receive, via a first graphical user interface (GUI) at a first device, a first search for an item;

determine whether the first device is a mobile device type or a desktop device type;

access a reinforcement learning model to generate a first search result, wherein the first search result is configured for display on the determined mobile device type or desktop device type;

cause the first search result to be presented via the first GUI;

receive, via the first GUI, a first state associated with the first search result, wherein the first state is based on an interaction, at the first GUI, with the first search result;

determine an association between the first search result and the first state;

generate a first machine learning model reward associated with the first search result based at least in part on the association between the first search result and the first state;

cause a change of weights of the reinforcement learning model based at least in part on the first machine learning model reward;

receive, via a second GUI at a second device, a second search for the item, wherein the second device is also the determined mobile device type or desktop device type;

cause, by using the reinforcement learning model, generation of a second search result based on the change of weights, based at least in part on the second device being a same device type as the first device; and cause the second search result to be presented via the second GUI.

16. The one or more non-transitory, computer-readable media of claim 15, wherein the sequence of instructions, when executed, cause the one or more processors to:

receive, via the second GUI, a second state associated with the second search result, wherein the second state is based on an interaction, at the second GUI, with the second search result;

generate a second machine learning model reward associated with the second search result based at least in part on the second state, wherein the second machine learning model reward is a positive machine learning model reward;

determine common information elements of the first search result and the second search result; and cause a change of weights of the reinforcement learning model to increase a probability that the reinforcement learning model causes a generation of a third search result in response to a search for the item to include the common information elements, wherein the third search result is configured to be displayed on a same device type as the first device and the second device.

17. The one or more non-transitory, computer-readable media of claim 15, wherein the sequence of instructions, when executed, cause the one or more processors to:

receive, via the second GUI, a second state associated with the second search result, wherein the second state is based on an interaction, at the second GUI, with the second search result;

generate a second machine learning model reward associated with the second search result based at least in part on the second state, wherein the second machine learning model reward is a negative machine learning model reward;

determine information elements of the first search result distinct from information elements of the second search result;

determine information elements of the second search result distinct from information elements of the first search result; and cause a change of weights of the reinforcement learning model to increase a probability that the reinforcement learning model causes a generation of a third search result in response to a search for the item to include the information elements of the first search result distinct from information elements of the second search result, and to exclude information elements of the second search result distinct from information elements of the first search result, wherein the third search result is configured to be displayed on a same device type as the first device and the second device.

18. The one or more non-transitory, computer-readable media of claim 15, wherein the first machine learning model reward is a negative machine learning model reward, and wherein the sequence of instructions, when executed, cause the one or more processors to:

receive, via the second GUI, a second state associated with the second search result, wherein the second state is based on an interaction, at the second GUI, with the second search result;

generate a second machine learning model reward associated with the second search result based at least in part on the second state, wherein the second machine learning model reward is a positive machine learning model reward;

determine information elements of the first search result distinct from information elements of the second search result;

determine information elements of the second search result distinct from information elements of the first search result; and cause a change of weights of the reinforcement learning model to increase a probability that the reinforcement learning model causes a generation of a third search result in response to a search for the item to include the information elements of the second search result distinct from information elements of the first search result, and to exclude information elements of the first search result distinct from information elements of the second search result, wherein the third search result is configured to be displayed on a same device type as the first device and the second device.

19. The one or more non-transitory, computer-readable media of claim 15, wherein the first machine learning model reward is a negative machine learning model reward, and wherein the sequence of instructions, when executed, cause the one or more processors to:

receive, via the second GUI, a second state associated with the second search result, wherein the second state is based on an interaction, at the second GUI, with the second search result;

generate a second machine learning model reward associated with the second search result based at least in part on the second state, wherein the second machine learning model reward is a negative machine learning model reward;

determine common information elements of the first search result and the second search result; and cause a change of weights of the reinforcement learning model to increase a probability that the reinforcement learning model causes a generation of a third search result in response to a search for the item to exclude the common information elements, wherein the third search result is configured to be displayed on a same device type as the first device and the second device.

\* \* \* \* \*